Oct. 25, 1949.                C. W. WILL                    2,485,797
              WHEEL TRUCK HAVING A FORWARD SWINGABLE
                AND ADJUSTABLE WHEELED SUPPORT
Filed June 11, 1948                              4 Sheets-Sheet 1

Conrad W. Will
INVENTOR.

BY Clarence A. O'Brien
and Harvey B. Jacobson
Attorneys

Oct. 25, 1949.                        C. W. WILL                        2,485,797
                 WHEEL TRUCK HAVING A FORWARD SWINGABLE
                       AND ADJUSTABLE WHEELED SUPPORT
Filed June 11, 1948                                           4 Sheets-Sheet 2

Conrad W. Will
            INVENTOR.

BY *Clarence A. O'Brien*
   *and Harvey B. Jacobson*
                    Attorneys

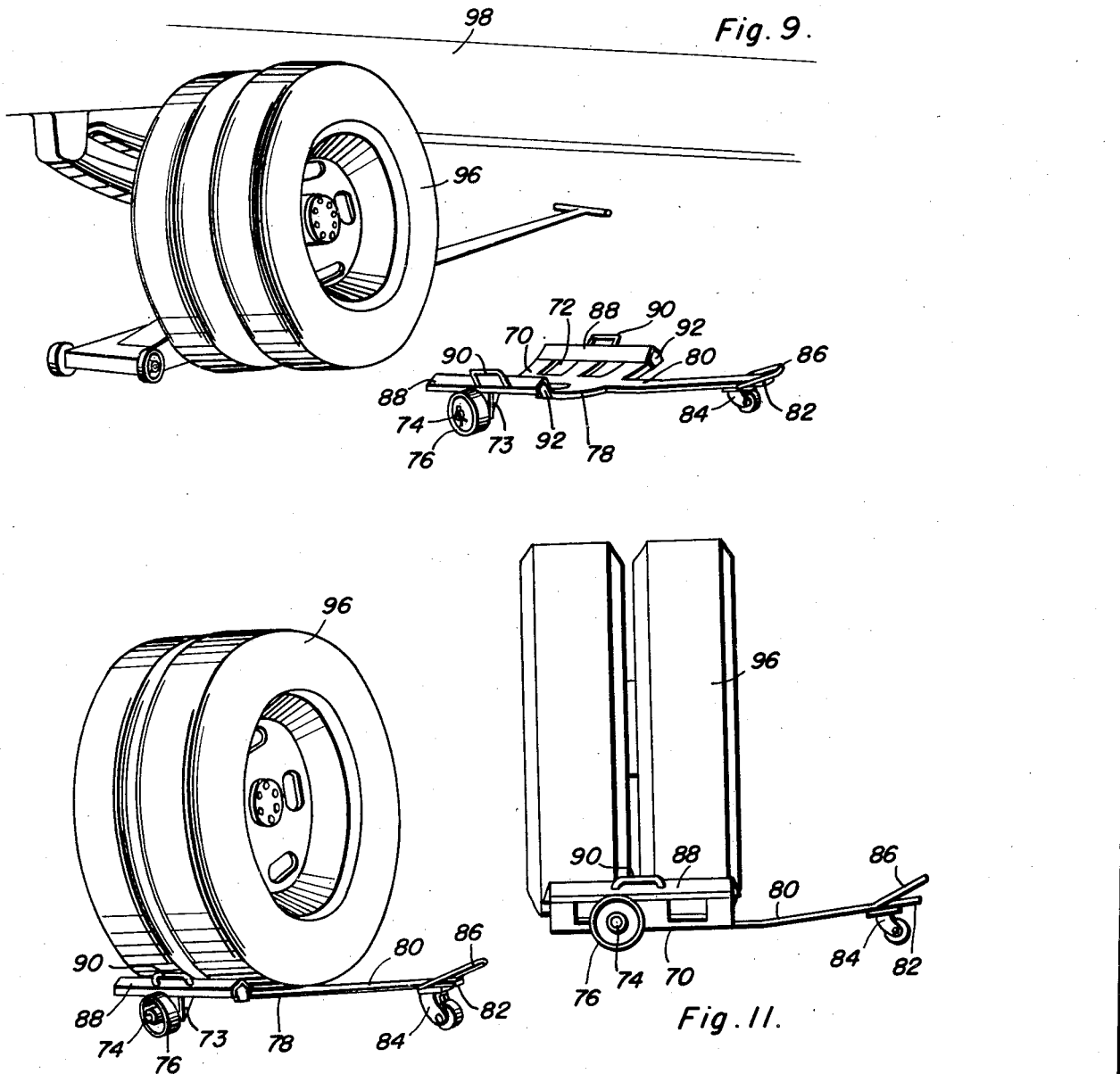

Oct. 25, 1949.
C. W. WILL
2,485,797
WHEEL TRUCK HAVING A FORWARD SWINGABLE
AND ADJUSTABLE WHEELED SUPPORT
Filed June 11, 1948
4 Sheets—Sheet 4
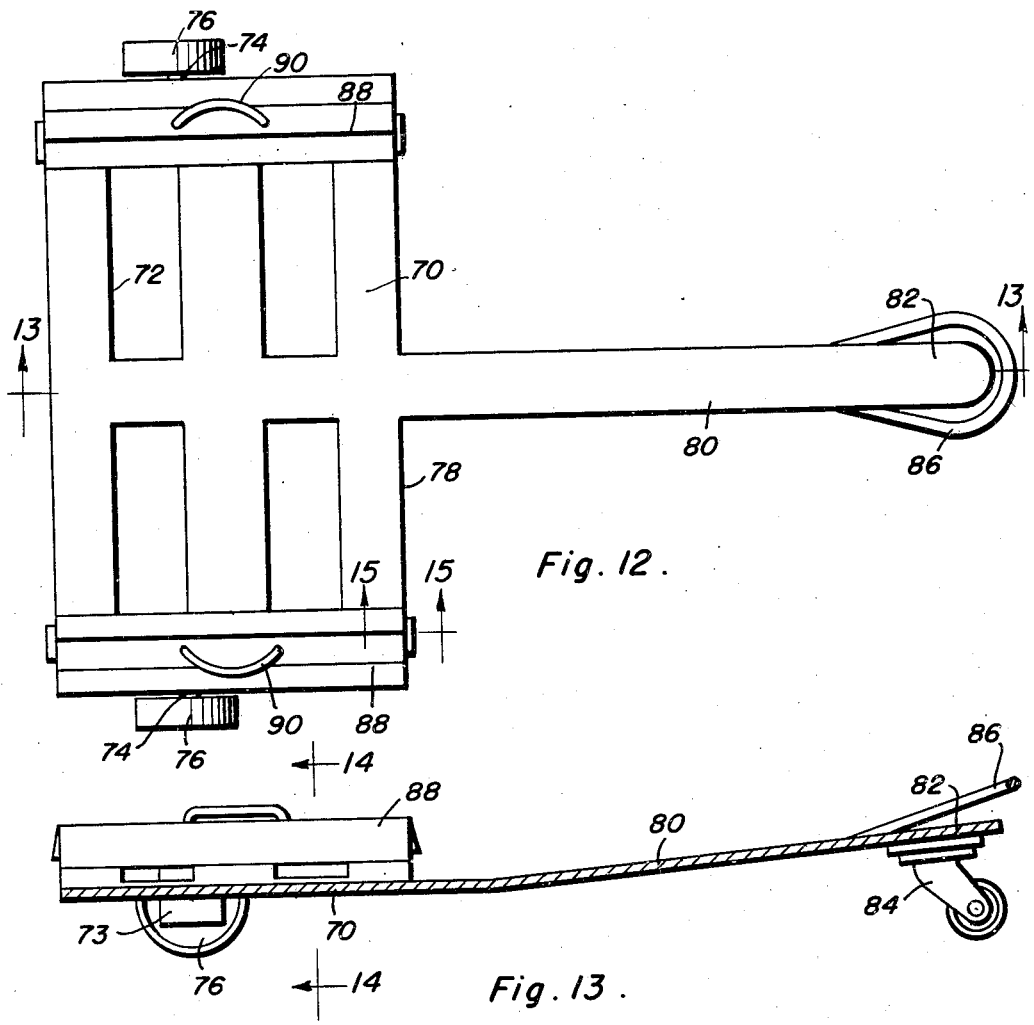
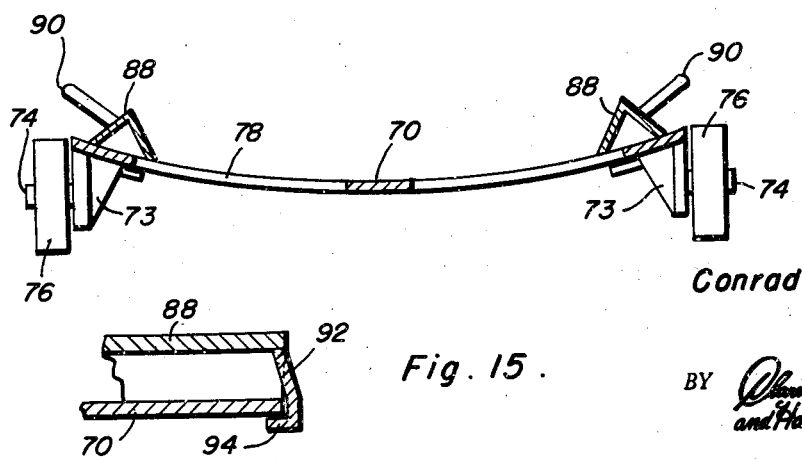
Conrad W. Will
INVENTOR.
BY
Attorneys Patented Oct. 25, 1949

2,485,797

UNITED STATES PATENT OFFICE 2,485,797

WHEEL TRUCK HAVING A FORWARD SWINGABLE AND ADJUSTABLE WHEELED SUPPORT

Conrad W. Will, Fortuna, Calif.

Application June 11, 1948, Serial No. 32,435

2 Claims. (Cl. 280—44)

This invention relates to new and useful improvements in wheel trucks and the primary object of the present invention is to provide a novel and improved wheel support or frame for the removal or replacement of vehicle tires and wheels, and more particularly, the heavy wheels of trucks and the like.

Another important object of the present invention is to provide a truck for use in the removal and replacement of heavy vehicle wheels including a wheeled frame and novel and improved means for adjustably raising the frame to engage the lower periphery or portion of a raised vehicle wheel.

A further object of the present invention is to provide a wheel truck for use in replacing and removing heavy vehicle wheels that includes a wheeled support embodying a swivelled guide wheel that is quickly and readily manipulated for conveniently positioning the support relative to a vehicle wheel.

A further object of the present invention is to provide a wheel truck for use in replacing and removing heavy vehicle wheels that includes a wheel supporting frame so designed as to facilitate the lower portion of a wheel to be positioned thereon without slipping or twisting during the removal of said wheel.

A still further aim of the present invention is to provide a truck of the aforementioned character that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming a part hereof, wherein like numerals refer to like parts throughout, and in which:

Figure 9 is a diagrammatic view showing the present wheel truck in slightly modified form, for application to a vehicle wheel;

Figure 10 is a perspective view of the vehicle wheel supporting truck in slightly modified form, and showing a vehicle wheel supported thereon;

Figure 11 is a side elevational view of Figure 10;

Figure 12 is a top plan view of the wheeled truck in modified form;

Figure 13 is a longitudinal vertical sectional view taken substantially on the plane of section line 13—13 of Figure 12;

Figure 14 is a transverse sectional view taken substantially on the plane of section line 14—14 of Figure 13; and Figure 15 is an enlarged fragmentary vertical sectional view taken substantially on the plane of section line 15—15 of Figure 12.

Figure 1:
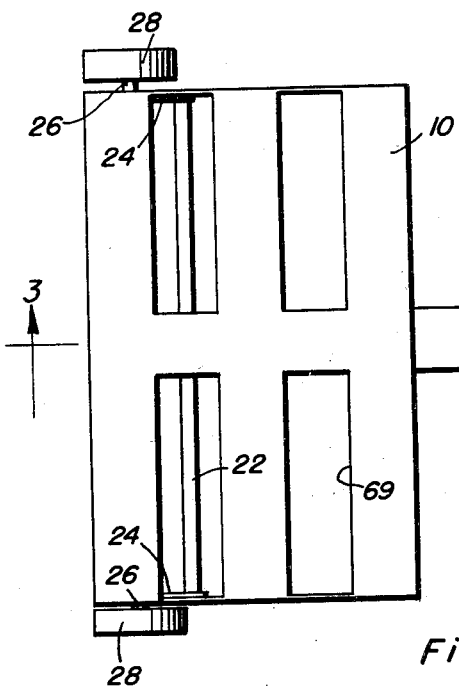
Figure 1 is a top plan view of the wheel truck constructed in accordance with the present invention.
Figure 2:
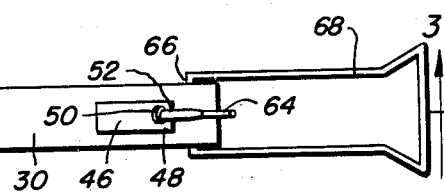
Figure 2 is a side elevational view of Figure 1.
Figure 2:
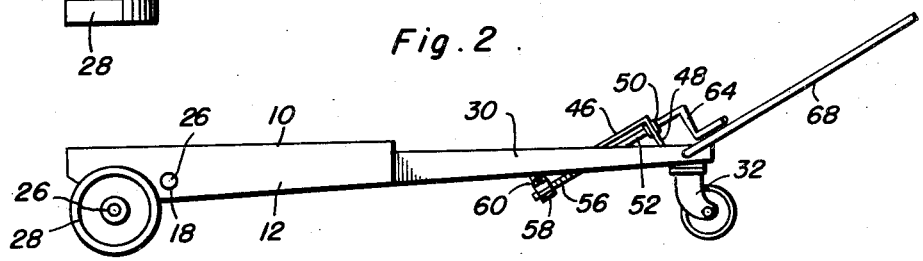

Referring now to the drawings in detail, wherein, for the purpose of illustration, there is disclosed a preferred embodiment of the present invention, the numeral 10 represents a substantially rectangular, concavo-convex frame or support having depending side flanges or walls 12, a depending rear wall 14, and a depending forward wall 16. The side walls 12 are provided with apertures 18 adjacent the forward wall 16 and rotatably engage the ends of a wheel supporting shaft or bar 22.

Fixed to the shaft 22, adjacent the ends thereof, by welding or the like, is a pair of outwardly projecting arms or levers 24, the outer ends of which are affixed to and support stub axles 26 that rotatably support forward wheels 28. The stub axles 26 are spaced parallel to the shaft 22 and engage the lower edges of the side walls 12 when the support 10 is in a normally lowered position as shown best in Figure 4 of the drawings.

Rigidly attached to the rear wall 14 of the support 10, and extending rearwardly therefrom, is a substantially channel-shaped handle or extension 30, the rear portion of which is supported by a caster or rear wheel 32 that is fixed to the extension for swivel movement.

Depending from the web portion of the extension 30 is an ear or pair of ears 34 that pivotally support a depending link 36. This link 36 is pivoted adjacent its lower end 38 to the rear terminal of an actuator bar 40, the forward terminal of which is pivoted, as at 42, between a pair of spaced ears 44 that are rigidly attached to and which project outwardly from substantially the central portion of shaft 22.

Fixed by welding or the like to the upper surface of the extension 30 are the ends of a substantially L-shaped bracket or support 46, one leg of which, for example, leg 48, removably supports a bearing 50 that rotatably receives an adjusting rod 52. The rod 52 extends downwardly and forwardly through an opening 54 provided in the extension 30, and the lower end 56 thereof is externally threaded to receivably engage an internally threaded sleeve or traveling member 58.

An eye element or ear 60 is rigidly attached to the sleeve 58 and is pivoted to the lower end of the link 36 by a pin or the like 62.

The outer or upper end of the actuating or adjusting rod 52 is integrally formed with a crank handle 64 which is conveniently rotated so that the sleeve or traveling member 58 may be adjusted on the threaded end 56 of the rod 52.

Pivoted to the rear portion of the extension 30 are the inturned ends 66 of an outwardly projecting, substantially U-shaped handle or grip 68.

It should be noted that the support or frame 10 is provided with a plurality of longitudinal slots or openings 69 that will permit the lower portion of a vehicle wheel to be positioned on the said frame 10 without movement due to the traction provided by the said support 10.

Figure 4:
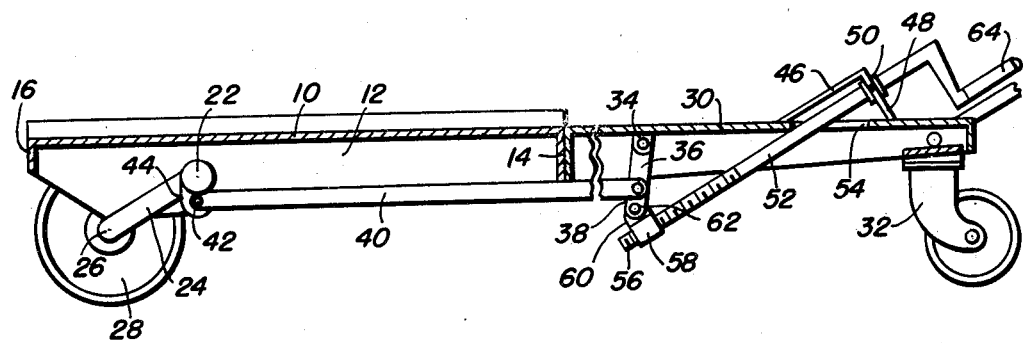
Figure 4 is a similar view of Figure 3, and showing the wheel supporting frame in a lowered and normal position.
Figure 5:
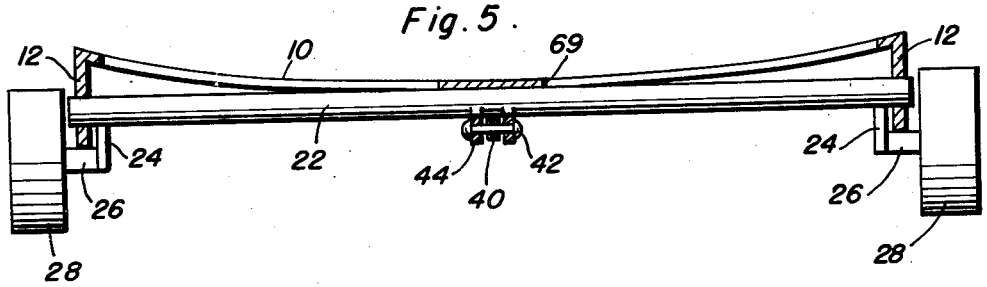
Figure 5 is a transverse vertical sectional view taken substantially on the plane of section line 5—5 of Figure 3.
Figure 6:
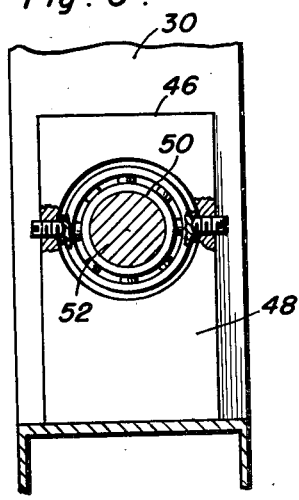
Figure 6 is an enlarged sectional view taken substantially on the plane of section line 6—6 of Figure 3.
Figure 7:
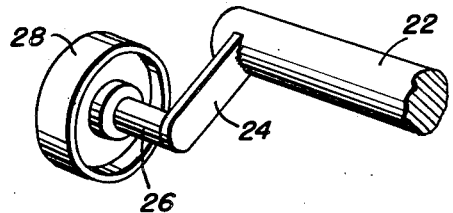
Figure 7 is a perspective view of one end of the wheel supporting shaft used in conjunction with the present invention, and showing the manner in which the forward wheels of the present truck are applied thereto.

In practical use of the present invention, the device is normally in that position illustrated in Figure 4 of the drawings, whereby the same may be wheeled or pushed to a position directly beneath the raised wheel of a vehicle.

Figure 3:
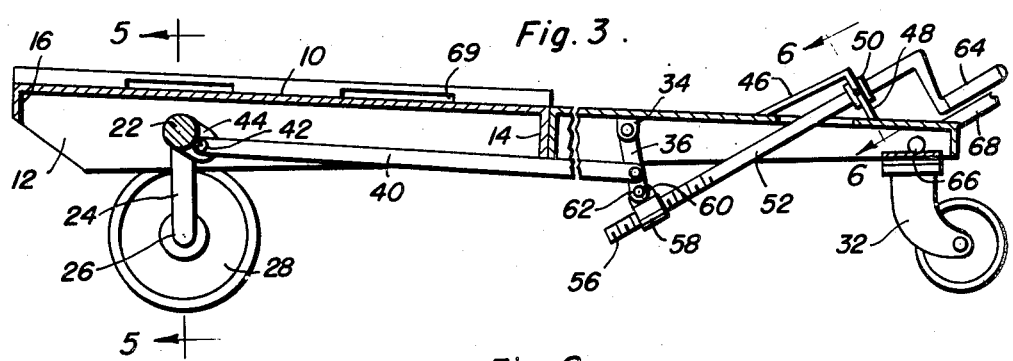
Figure 3 is an enlarged longitudinal vertical sectional view taken substantially on the plane of section line 3—3 of Figure 1 and showing the wheel supporting frame in a raised position.
Figure 8:
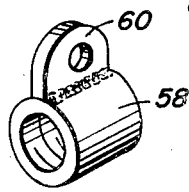
Figure 8 is a perspective view of the traveling member or sleeve that is used in conjunction with the present invention.

By rotating or actuating the crank handle 64 in one direction, the sleeve 58 will move upwardly on the threaded end 56 of the rod 52, pulling the actuator bar rearwardly, rotating the shaft 22 in a counter-clockwise direction (as shown in Figures 3 and 4), and thus pivoting the links or levers 24 to a substantially vertical position which will raise the forward portion of the support 10, as shown in Figure 3. In this position, the support 10 will bear upwardly against the vehicle wheel, permitting the holding lugs (not shown) to be disengaged from the wheel assembly in a convenient manner and the wheel to be removed from the vehicle. Obviously, by selectively adjusting or raising the platform 10, the device will accommodate vehicle wheels which are raised variable amounts. When the wheel has been removed, the platform 10 may be conveniently lowered to its normal position.

Reference is now directed to Figures 8–14, inclusive, wherein there is disclosed the present invention in slightly modified form. In this embodiment, the numeral 70 represents a substantially rectangular, concavo-convexed support or frame having a plurality of traction openings 72.

Rigidly secured to and depending from the convexed lower face of the support 70 is a pair of opposed bearings or ears 73 that fixedly support outwardly projecting stub axles 74 on which there are rotatably mounted support wheels 76. It should be noted that the axes of the stub axles 74 are disposed forwardly of the longitudinal axis of the support 70 so that the greater weight of the support 70 will be rearwardly of the wheel 76.

Extending rearwardly from the support 70, and preferably integrally formed with or rigidly attached to the rear longitudinal edge 78 of the support 70 is an elongated, upwardly inclined handle or rectangular extension 80, the rear terminal 82 of which rotatably supports a swivelled guide wheel or caster 84. Rigidly secured to the rear terminal 82 of the handle 80 and inclining upwardly therefrom is a substantially U-shaped hand grip 86.

The numeral 88 represents a pair of inverted, substantially V-shaped wheel support strips or wedges, the edges of which bear upon the concaved upper surface of the support 70 adjacent the transverse edges thereof. These strips 88 are provided with outwardly extending rigid grips 90 for the convenient handling and positioning thereof relative to the support 10. Fixed to the transverse edges of each of the strips 88 are depending, angulated retainer members or stops 92 that engage the longitudinal edges of the support 70. The lower ends of the retainer members 92 are turned inwardly to form flanges 94 that engage the lower face of the support 70, as shown best in Figure 15 of the drawings.

In practical use of the latest embodiment of the present wheel truck, the heavy wheel 96 of a truck 98 is first raised or lifted by a suitable jack and the support pushed forwardly under the wheel 96 so that the wheel 96 may be lowered and supported on the support 70 and between the support strips 88. Wheel 96 is then removed from the axle of the truck 98 by removing the holding lugs (not shown) and the support 70 pulled outwardly from the truck 98, as shown in Figures 10 and 11.

The single guide wheel 84 facilitates the convenient positioning of the support 70 under the wheel 96 in a more simplified manner than could be accomplished by the normal practice of employing a dual guide wheel assembly.

In view of the foregoing description, taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A truck for use in removing and replacing vehicle wheels comprising an elongated substantially rectangular support having depending end flanges and a depending rear flange, an elongated channel shaped extension fixed to and projecting laterally from the rear flange of said support, a rear wheel secured to the extension for swivel movement, said end flanges having aperatures, a shaft having its ends journalled for rotation in the apertures provided in said end flanges, lateral projections fixed to the shaft adjacent the ends of said shaft and limiting sliding movement of the shaft relative to the end flanges, stub axles fixed to said projections and extending outwardly from the end flanges, a forward pair of wheels mounted on the stub axles, a pair of spaced ears fixed to and projecting laterally from the central portion of said shaft, a link pivoted to and depending from the channel shaped extension, an actuator bar having forward and rear portions, the forward portion of said bar being pivoted between said ears and the rear portion of said bar being pivoted to said link, an internally threaded sleeve pivoted to the link, said extension having a slot, a support bracket secured to said handle and overlying the slot, an adjusting rod journalled for rotation on said support bracket and extending through the slot, said rod being threadingly connected to said sleeve for movement of the actuator bar to rotate the shaft and move and retain the forward wheels adjusted relative to the rectangular support upon rotation of said adjusting rod.

2. The combination of claim 1 wherein the rear flange includes a lower edge contacting the actuator bar to limit upward movement of the actuator bar relative to the rectangular support.

CONRAD W. WILL.

REFERENCES CITED

The following references are of record in the file of this patent:

UNITED STATES PATENTS

| Number | Name | Date |
| --- | --- | --- |
| 710,394 | Smith | Sept. 30, 1902 |
| 1,708,649 | Bente | Apr. 9, 1929 |
| 1,806,460 | Hopkins | May 19, 1931 |
| 2,207,443 | Schneider | July 9, 1940 |
| 2,345,458 | Caron | Mar. 28, 1944 |